United States Patent
Stille et al.

(10) Patent No.: US 11,438,831 B2
(45) Date of Patent: Sep. 6, 2022

(54) NETWORK SLICING AWARENESS IN IP MULTIMEDIA SUBSYSTEM

(71) Applicant: Telefonaktiebolaget LM Ericsson (publ), Stockholm (SE)

(72) Inventors: Mats Stille, Bromma (SE); Ralf Keller, Würselen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/969,975

(22) PCT Filed: Mar. 23, 2018

(86) PCT No.: PCT/SE2018/050303
§ 371 (c)(1),
(2) Date: Aug. 13, 2020

(87) PCT Pub. No.: WO2019/182493
PCT Pub. Date: Sep. 26, 2019

(65) Prior Publication Data
US 2020/0413326 A1    Dec. 31, 2020

(51) Int. Cl.
*H04W 4/00* (2018.01)
*H04W 48/18* (2009.01)
(Continued)

(52) U.S. Cl.
CPC ......... *H04W 48/18* (2013.01); *H04L 65/1006* (2013.01); *H04L 65/1016* (2013.01);
(Continued)

(58) Field of Classification Search
CPC . H04L 65/1006; H04L 65/1016; H04L 12/14; H04L 65/1073; H04L 12/1407;
(Continued)

(56) References Cited

U.S. PATENT DOCUMENTS

2012/0184244 A1    7/2012   Cai et al.
2014/0370834 A1    12/2014  Liu et al.
(Continued)

FOREIGN PATENT DOCUMENTS

| WO | 2017063708 A1 | 4/2017 |
| WO | 2017086847 A1 | 5/2017 |
| WO | 2017113100 A1 | 7/2017 |

OTHER PUBLICATIONS

International Search Report and Written Opinion for International Application No. PCT/SE2018/050303, dated Sep. 17, 2018, 27 pages.

(Continued)

*Primary Examiner* — Huy C Ho
(74) *Attorney, Agent, or Firm* — Nicholson De Vos & Webster & Elliott LLP (57) ABSTRACT

A method performed within a communication system comprising a 5G core network and an IP Multimedia Subsystem (IMS) network, where the 5G core network is configured to implement a plurality of virtual core network slices each having a slice identifier. The method comprises assigning one of said virtual core network slices to a User Equipment (UE) at or following registration of said UE with the IMS network, and sending from the UE or the 5G core network, to the IMS network, the slice identifier of the network slice assigned to the UE. The method further comprises receiving the slice identifier within the IMS network and storing in the IMS network a mapping between the UE and the received network slice identifier. The slice identifier is used within the IMS network to provision services to the UE.

16 Claims, 5 Drawing Sheets

(51) Int. Cl.
*H04W 76/11* (2018.01)
*H04L 65/10* (2022.01)
*H04L 65/1016* (2022.01)
*H04L 65/1073* (2022.01)
*H04M 15/00* (2006.01)
*H04W 4/24* (2018.01)

(52) U.S. Cl.
CPC ........ *H04L 65/1073* (2013.01); *H04M 15/66* (2013.01); *H04W 4/24* (2013.01); *H04W 76/11* (2018.02)

(58) Field of Classification Search
CPC ...... H04M 15/66; H04M 15/63; H04M 15/57; H04W 4/24; H04W 48/18; H04W 76/11; H04W 84/00; H04W 24/04; H04W 24/02
USPC .......................................................... 370/329
See application file for complete search history.

(56) References Cited

U.S. PATENT DOCUMENTS

| | | | |
|---|---|---|---|
| 2017/0048330 A1* | 2/2017 | Montemurro | H04L 67/141 |
| 2021/0212134 A1* | 7/2021 | Sternberg | H04W 12/069 |

OTHER PUBLICATIONS

J. Rosenberg et al., "Indicating User Agent Capabilities in the Season Initiation Protocol (SIP)," Aug. 2004, 36 pages, Network Working Group, Request for Comments: 3840, The Internet Society.
3GPP TSG-SA WG1 Meeting #78, "Addition of requirement on charging for the tenant of the slice," May 8-12, 2017, 2 pages, S1-172288, Porto, Portugal.
SA WG2 Meeting #126, "Solution for key issue 3: Network Slicing and IMS," Feb. 26-Mar. 2, 2018, 4 pages, S2-182165, Montreal, Canada.
SA WG2 Meeting #126, "Solution for Network Slicing and IMS Scenario 2," Feb. 26-Mar. 2, 2018, 4 pages, S2-182176, Montreal, Canada.
10SA WG2 Meeting #116, "Service Triggered Network Slice Selection Procedure," Jul. 11-15, 2016, 7 pages, S2-163980 (S2-164202), Vienna, Austria.
3GPP TS 23.228 V15.2.0, "3rd Generation Partnership Project; Technical Specification Group Services and System Aspects; IP Multimedia Subsystem (IMS); Stage 2 (Release 15)," Mar. 2018, 330 pages, 3GPP Organizational Partners.
3GPP TS 23.501 V15.0.0, "3rd Generation Partnership Project; Technical Specification Group Services and System Aspects; System Architecture for the 5G System; Stage 2 (Release 15)," Dec. 2017, 181 pages, 3GPP Organizational Partners.
3GPP TS 24.501 V0.3.1, "3rd Generation Partnership Project; Technical Specification Group Core Network and Terminals; Non-Access-Stratum (NAS) protocol for 5G System (5GS); Stage 3 (Release 15)," Feb. 2018, 225 pages, 3GPP Organizational Partners.
3GPP TS 29.211 V6.4.0, "3rd Generation Partnership Project; Technical Specification Group Core Network and Terminals; Rx Interface and Rx/Gx signalling flows (Release 6)," Jun. 2007, 27 pages, 3GPP Organizational Partners.
3GPP TS 29.513 V0.3.0, 3rd Generation Partnership Project; Technical Specification Group Core Network and Terminals; 5G System; Policy and Charging Control signalling flows and QoS parameter mapping; Stage 3 (Release 15), Jan. 2018, 20 pages, 3GPP Organizational Partners.
3GPP TS 29.514 V0.2.0, "3rd Generation Partnership Project; Technical Specification Group Core Network and Terminals; 5G System; Policy Authorization Service; Stage 3 (Release 15)," Jan. 2018, 28 pages, 3GPP Organizational Partners.
Invitation to Pay Additional Fees for Application No. PCT/SE2018/050303, dated Jun. 21, 2018, 17 pages.
International Preliminary Report on Patentability for Application No. PCT/SE2018/050303, dated Oct. 8, 2020, 20 pages.
Notice of Final Rejection for KR Application No. 10-2020-7021343, dated Jun. 14, 2022, 8 pages.

* cited by examiner

NETWORK SLICING AWARENESS IN IP MULTIMEDIA SUBSYSTEM

CROSS-REFERENCE TO RELATED APPLICATIONS

This application is a National stage of International Application No. PCT/SE2018/050303, filed Mar. 23, 2018, which is hereby incorporated by reference.

TECHNICAL FIELD

The invention relates to network slicing awareness in the IP Multimedia Subsystem.

BACKGROUND

IP Multimedia services provide a dynamic combination of voice, video, messaging, data, etc. within the same session. By growing the number of basic applications and the media that it is possible to combine, the number of services offered to the end users will grow, and the inter-personal communication experience will be enriched. This will lead to a new generation of personalised, rich multimedia communication services.

IP Multimedia Subsystem (IMS) is the technology defined by the Third Generation Partnership Project (3GPP) to provide IP Multimedia services over mobile communication networks. IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly.

Network slicing is a mechanism that enables mobile network operators to spread their subscribers and business support over separate virtual logical networks, each with its own dedicated resources, although some resources could be shared across multiple network slices as decided by operator configuration. The concept also allows a subscriber device to host different applications where the different applications can be served by different slices.

"Network slices" are logically separated partitions of a network. A network slice is defined by a number of customizable functions that govern geographical coverage area, duration capacity, speed, latency, security, availability etc. Each slice is a separate logical virtual network which may share the same physical network infrastructure. Each network slice is isolated from each other network slice, such that the network conditions (e.g. a high traffic load) in one slice do not impact the performance of another slice. A benefit of this isolation is that it allows for a fast and secure feature or configuration upgrade, and also customizations, without having to limit or impact the traffic in another network slices in any way. The operator can decide on a per device type or on business basis which groups are assigned to which network slice. In one example machine type devices are assigned to one network slice and consumer smart devices in another. In yet another example, a major car rental company gets a network slice of their own.

3GPP is currently in the process of defining the 5G standard for mobile telephony services. This includes provision for network slicing. According to the current state of the standard, 5G devices can indicate which 5G packet core network slice they want to be assigned to as part of the device registration/attach procedure to the network, or when establishing a 5G packet data session over the network it is registered to. WO2017/063708 describes a method of providing network slice information to a UE during the registration procedure.

A problem with the existing technology is that only the radio network and 5G packet core network get the network slice identifier. The IMS core network does not. This can limit the operator's ability to, for example, get network slice identity (slice ID) in IMS initiated call charging records, and to detect a sudden increase of dropped calls from a certain network slice. This may be especially problematic if the operator has configured the system so that the traffic from two or more 5G packet core network slices are handled by one and the same shared IMS core network.

SUMMARY

It is an objective of the present invention to solve this problem by having either the UE or the 5G packet core network provide the IMS core network with the network slice identifier of the network slice assigned to the UE.

If done by the UE, the network slice identifier could be included in a SIP REGISTER message that the UE sends to the logical IMS network Proxy-Call Session Control Function (P-CSCF) serving the subscriber. The information provided by the UE should be verified by the network. If done by the 5G packet core network, the network slice identifier could be notified by the 5GC Session Management Function (SMF) to the Policy Control Function (PCF) and then over the Rx or N5 interface to the IMS core network P-CSCF.

According to a first aspect of the present invention there is provided a method performed within a communication system comprising a 5G core network and an IP Multimedia Subsystem, IMS, network, where the 5G core network can be configured to implement a plurality of virtual core network slices each having a slice identifier. The method comprises assigning one of said virtual core network slices to a User Equipment, UE, at or following registration of said UE with the IMS network and sending from the UE or the 5G core network, to the IMS network, the slice identifier of the network slice assigned to the UE. The method also comprises receiving the slice identifier within the IMS network and storing in the IMS network a mapping between the UE and the received network slice identifier. The method further comprises using the slice identifier within the IMS network to provision services to the UE.

The step of using the slice identifier to provision services may comprise providing a service from a subset of services identified as being available to the UE based on the slice identifier.

Optionally, the method comprises sending UE charging data from the IMS network to a remote billing system, wherein said charging data includes the slice identifier of the network slice assigned to the UE.

The method may comprise performing the method for a multiplicity of UEs and storing in the IMS network a mapping between the multiplicity of UEs registered with the IMS and respective slice identifiers. The method may then also comprise gathering, within the IMS network, network data from the plurality of UEs and using the mapping to generate network slice specific data from said network data. The network data can comprise the call drop rate and/or the call success rate of the plurality of UEs, and the network slice specific data accordingly comprises the call drop rate and/or the call success rate of each network slice assigned to one or more of the UEs.

Optionally, the step of sending comprises sending a SIP REGISTER message or a SIP INVITE message from the UE to the IMS network, wherein the slice identifier is included in a feature tag set by the UE in a Contact header field of the SIP message. The feature tag may be a new media feature tag as defined in and following the rules of IETF RFC 3840.

Alternatively, the step of sending comprises sending the slice identifier from a Policy Control Function, PCF, or a Policy and Charging Rules Function, PCRF, of the 5G core network. The step of sending may be performed in response to receiving at the PCF or PCRF of the 5G network a policy request from a Proxy-Call Session Control Function, P-CSCF, of the IMS network, wherein said policy request is for a session associated with the U E.

According to a second aspect of the present invention there is provided a method performed at a User Equipment, UE, within a communication system comprising a 5G core network and an IP Multimedia Subsystem, IMS, network, where the 5G core network is configured to provide a plurality of virtual core network slices each having a slice identifier, wherein the UE has been assigned one of said virtual core network slices. The method comprises sending a Session Initiation Protocol, SIP, REGISTER message or a SIP INVITE message to a Call Session Control Function, CSCF, of the IMS, wherein said SIP message includes the slice identifier of the network slice assigned to the UE.

The slice identifier can be included in a feature tag set by the UE in a Contact header field of the SIP message, and the feature tag may be a new media feature tag as defined in IETF RFC 3840.

The method may also comprise receiving the slice identifier from the 5G core network.

According to a third aspect of the present invention there is provided a method performed by a Policy Control Function, PCF, or a Policy and Charging Rules Function, PCRF, of a 5G core network within a communication system comprising the 5G core network and an IP Multimedia Subsystem, IMS, network, where the 5G core network is configured to provide a plurality of virtual core network slices each having a slice identifier. The method comprises receiving from a Proxy-Call Session Control Function, P-CSCF, of the IMS a policy request for a session associated with a User Equipment, UE, determining policy rules for the session, and sending a request to a Session Management Function, SMF, of the 5G core network to implement the policy rules. The method also comprises receiving from the SMF a response including a slice identifier of a network slice assigned to the UE, and sending the response with the slice identifier to the P-CSCF of the IMS.

The policy request received from the P-CSCF and the response sent to the P-CSCF may be RESTful Hyper Text Transmission Protocol, HTTP, messages.

Alternatively, the policy request received from the P-CSCF and the response sent to the P-CSCF may be DIAMETER protocol messages.

The request sent to the SMF and the response received from the SMF may be RESTful HTTP messages.

According to a fourth aspect of the present invention there is provided a method performed by a Proxy-Call Session Control Function, P-CSCF, of an IP Multimedia Subsystem, IMS, network within a communication system comprising a 5G core network and the IMS network, where the 5G core network is configured to provide a plurality of virtual core network slices each having a slice identifier. The method comprises sending a policy request for a session associated with a User Equipment, UE, to a Policy Control Function, PCF, or a Policy and Charging Rules Function, PCRF, of the 5G core network, and receiving a response from the PCF or PCRF including a slice identifier of a network slice assigned to the UE.

The method may also comprise adding the network slice identifier as an asserted network slice feature tag. The asserted network slice feature tag may replace a network slice feature tag previously provided by the UE.

According to a fifth aspect of the present invention there is provided a method performed by a Session Management Function, SMF, of a 5G core network within a communication system comprising the 5G core network and an IP Multimedia Subsystem, IMS, network, where the 5G core network comprises a plurality of virtual core network slices each having a slice identifier. The method comprises receiving from a Policy Control Function, PCF, or a Policy and Rules Charging Function, PCRF, of the 5G core network a request to implement policy rules for a session associated with User Equipment, UE. The method also comprises sending to the PCF or PCRF a response including a slice identifier of a network slice assigned to the UE.

According to a sixth aspect of the present invention there is provided a method performed at an Application Server, AS, of an IP Multimedia Subsystem, IMS, network within a communication system comprising the 5G core network and the IMS network, where the 5G core network is configured to provide a plurality of virtual core network slices each having a slice identifier. The method comprises receiving, from a Call Session Control Function, CSCF, of the IMS, a slice identifier of a network slice assigned to a User Equipment, UE. The method also comprises using the slice identifier to provision services to the UE.

According to a seventh aspect of the present invention there is provided a User Equipment, UE, configured for use with a communication system comprising a 5G core network and an IP Multimedia Subsystem, IMS, network, where the 5G core network is configured to provide a plurality of virtual core network slices each having a slice identifier, and wherein, in use, the UE is assigned one of said virtual core network slices. The UE comprises a sender for sending a Session Initiation Protocol, SIP, REGISTER message or a SIP INVITE message to a Call Session Control Function, CSCF, of the IMS, wherein said SIP message includes the slice identifier of the network slice assigned to the UE.

The UE may also comprise a receiver for receiving the slice identifier from the 5G core network.

According to an eighth aspect of the present invention there is provided an apparatus for implementing a Policy Control Function, PCF, or a Policy and Charging Rules Function, PCRF, of a 5G core network within a communication system comprising the 5G core network and an IP Multimedia Subsystem, IMS, network, where the 5G core network is configured to provide a plurality of virtual core network slices each having a slice identifier. The apparatus comprises a receiver configured to receive from a Proxy-Call Session Control Function, P-CSCF, of the IMS a policy request for a session associated with a User Equipment, UE. The apparatus also comprises a processor configured to determine policy rules for the session, and a sender configured to send a request to a Session Management Function, SMF, of the 5G core network to implement the policy rules.

The receiver is further configured to receive from the SMF a response including a slice identifier of a network slice assigned to the UE. The sender is further configured to send the response with the slice identifier to the P-CSCF of the IMS.

According to a ninth aspect of the present invention there is provided an apparatus for implementing a Proxy-Call Session Control Function, P-CSCF, of an IP Multimedia Subsystem, IMS, network within a communication system comprising a 5G core network and the IMS network, where the 5G core network is configured to provide a plurality of virtual core network slices each having a slice identifier. The apparatus comprises a sender for sending a policy request for a session associated with a User Equipment, UE, to a Policy Control Function, PCF, or a Policy and Charging Rules Function, PCRF, of the 5G core network. The apparatus also comprises a receiver for receiving a response from the PCF or PCRF including a slice identifier of a network slice assigned to the UE.

According to a tenth aspect of the present invention there is provided an apparatus for implementing a Session Management Function, SMF, of a 5G core network within a communication system comprising the 5G core network and an IP Multimedia Subsystem, IMS, network, where the 5G core network comprises a plurality of virtual core network slices each having a slice identifier, the apparatus comprises a receiver for receiving from a Policy Control Function, PCF, or a Policy and Rules Charging Function, PCRF, of the 5G core network a request to implement policy rules for a session associated with User Equipment, UE. The apparatus also comprises a sender for sending to the PCF or PCRF a response including a slice identifier of a network slice assigned to the UE.

According to an eleventh aspect of the present invention there is provided an Application Server, AS, of an IP Multimedia Subsystem, IMS, network within a communication system comprising the 5G core network and the IMS network, where the 5G core network comprises a plurality of virtual core network slices each having a slice identifier, the AS comprises a receiver for receiving, from a Call Session Control Function, CSCF, of the IMS, a slice identifier of a network slice assigned to a User Equipment, UE, and a processor configured to use the slice identifier to provision services to the UE.

DETAILED DESCRIPTION

Methods of providing the network slice identifier to the IMS core network are described here, and which comprise sending the slice identifier from the UE, or from the 5G core network, to the IMS. The IMS stores a mapping between the UEs registered with the IMS and their respective network slice identifiers. The mapping may be stored at a SIP-AS. If the AS receives the mapping from the Serving-Call Session Control Function (S-CSCF) in a third party SIP REGISTER, the mapping can be retained until the next de-registration. If the AS receives the mapping from the S-CSCF by a SIP INVITE, the mapping can be retained just for the duration of the session. The slice identifiers can then be used within the IMS to provision services to UEs based on the specific network slice assigned to them. The IMS may provide a subset of services identified as being available to a UE based on its assigned network slice. For example, the provision of services may comprise allowing or not allowing the adding of video to a call, or not executing call forwarding unconditionally for the UE.

The mapping can also be used within the IMS to generate slice specific network data. In one embodiment, the IMS gathers network data from a plurality of UEs registered with the IMS. The network data comprises call drop rate and call success rate. The mapping between UEs and the respective slice identifiers is then used to generate network slice specific data from the network data. The slice specific data comprises the call drop rate and the call success rate of the individual network slices assigned to those UEs.

An advantage of the described embodiments is increased transparency to the complete core network, allowing not just the radio and 5G core networks, but also the IMS core network serving the subscriber, to be network slicing aware and to provide slice specific service behaviour. This enables the IMS network to take the network slice ID into concern for its call performance statistics, charging, selection of application servers, routing and other applicable features. Two solutions will now be described.

1. UE Provided Network Slice ID

Figure 1:
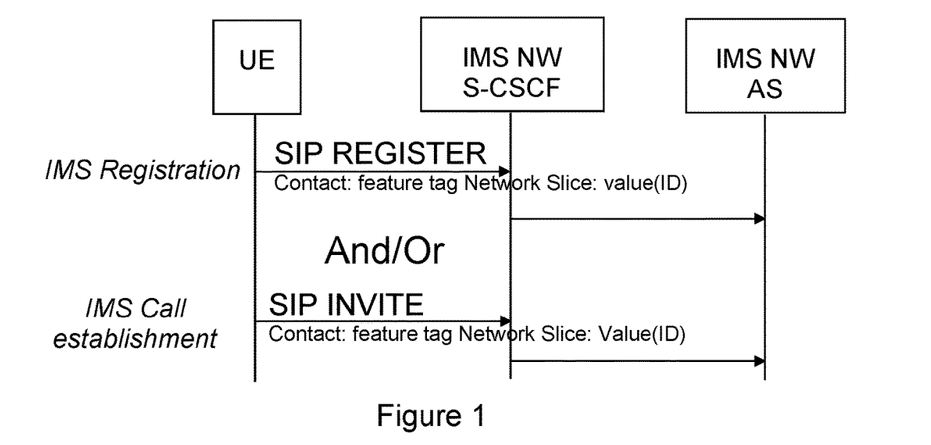
FIG. 1 is a signaling flow illustrating a method according to an embodiment in which a UE provides the network slice identifier to the IMS.

In one embodiment the network slice identifier (ID) is provided to the IMS network by the UE. The UE will have obtained this network slice ID when registering with the 5G core network (5GC) or when establishing a 5G data packet session over the network. FIG. 1 illustrates this method in which a device (UE) provides the network slice ID directly to the IMS by means of a new feature tag (e.g. a new media feature tag as described in IETF RFC 3840) referred to as "Network Slice", which indicates the network slicing capability of the UE. The feature tag is set to a value corresponding to the ID of the slice. The feature tag is set by the UE in the Contact header of a SIP REGISTER or a SIP INVITE message. The UE sends the SIP message with the "Network Slice" feature tag to the Serving-Call Session Control Function (S-CSCF) via the Proxy-Call Session Control Function (P-CSCF) of the IMS network (IMS NW). The network slice ID is stored in the S-CSCF of the IMS. The S-CSCF then forwards the SIP message to the relevant Application Server (AS) in the IMS NW. The AS may subscribe to UE SIP registration events from the S-CSCF in order to receive the SIP REGISTER message. In case of a SIP INVITE, the message may be forwarded to the AS according to filter criteria.

With a special "Network Slice" feature tag in the UE initiated REGISTER, or INVITE request, the IMS core can use the standard filter criteria in the Home Subscriber Server (HSS) to forward the request to different IMS network application servers depending on which network slice the request originates from.

Alternatively, a particular AS may only be invoked if the special "Network Slice" feature tag indicates the configured slice type. This requires the filter criteria stored in the HSS to include the special "Network Slice" feature tag.

The "Network Slice" feature tag can also be provided to an AS via 3rd party registration or via the INVITE and used by the AS to provide slice specific behaviour. For example, the AS may allocate certain resources to a UE based on the specific network slice assigned to the UE. In addition, if the HSS includes service profiles, the AS could request a slice specific service profile. Egress interconnect selection may be enhanced since the IMS Breakout Gateway Control Function (BGCF) can decide which outgoing route (e.g. Interconnection Border Control Function, IBCF) to use based on SIP header content such as the new "Network Slice" feature tag in a SIP Contact header.

2. Packet Core Network Provided Network Slice ID

In another embodiment, the network slice ID is provided to the IMS network by the 5G packet core network (5GC) which comprises a Session Management Function (SMF) and a Policy Control Function (PCF). When the UE registered with the 5GC, or established 5G data session over the network, it will have been allocated a network slice and the ID of this slice will have been recorded at the SMF.

Figure 2:
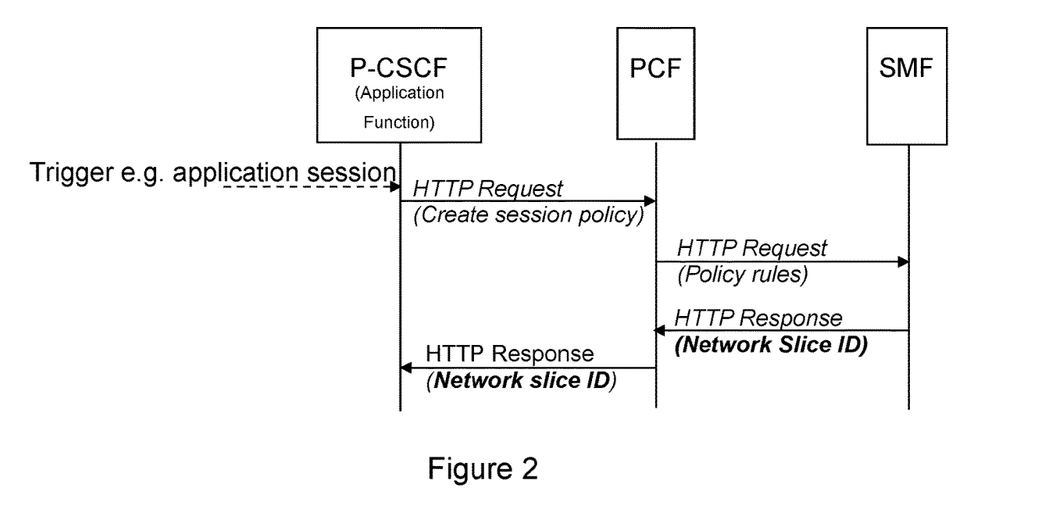
FIG. 2 is a signaling flow illustrating a method according to an embodiment in which the 5G core network provides the network slice identifier to the IMS.

FIG. 2 illustrates this method in which the 5G packet core network provides the network slice ID to the IMS. The method might be carried out, for example, while establishing a packet core connection for a voice call. The IMS NW P-CSCF sends a policy request for the session to the (PCF) of the 5GC. The PCF determines the policy rules and sends a request to the SMF to apply the policy rules. The SMF sends a response which includes the network slice ID to the PCF. The PCF forwards the response with the slice ID to the P-CSCF. The P-CSCF adds the slice ID as an asserted network slicing feature tag, possibly replacing a UE provided network slicing feature tag In the embodiment illustrated by FIG. 2, the IMS and PCF are deployed according to a 5G architecture using HTTP Restful (i.e. stateless) procedures with the 5GC. Alternatively, DIAMETER protocol can be used between the P-CSCF and PCRF/PCF, and HTTP between PCRF/PCF and SMF (not depicted).

Figure 3:
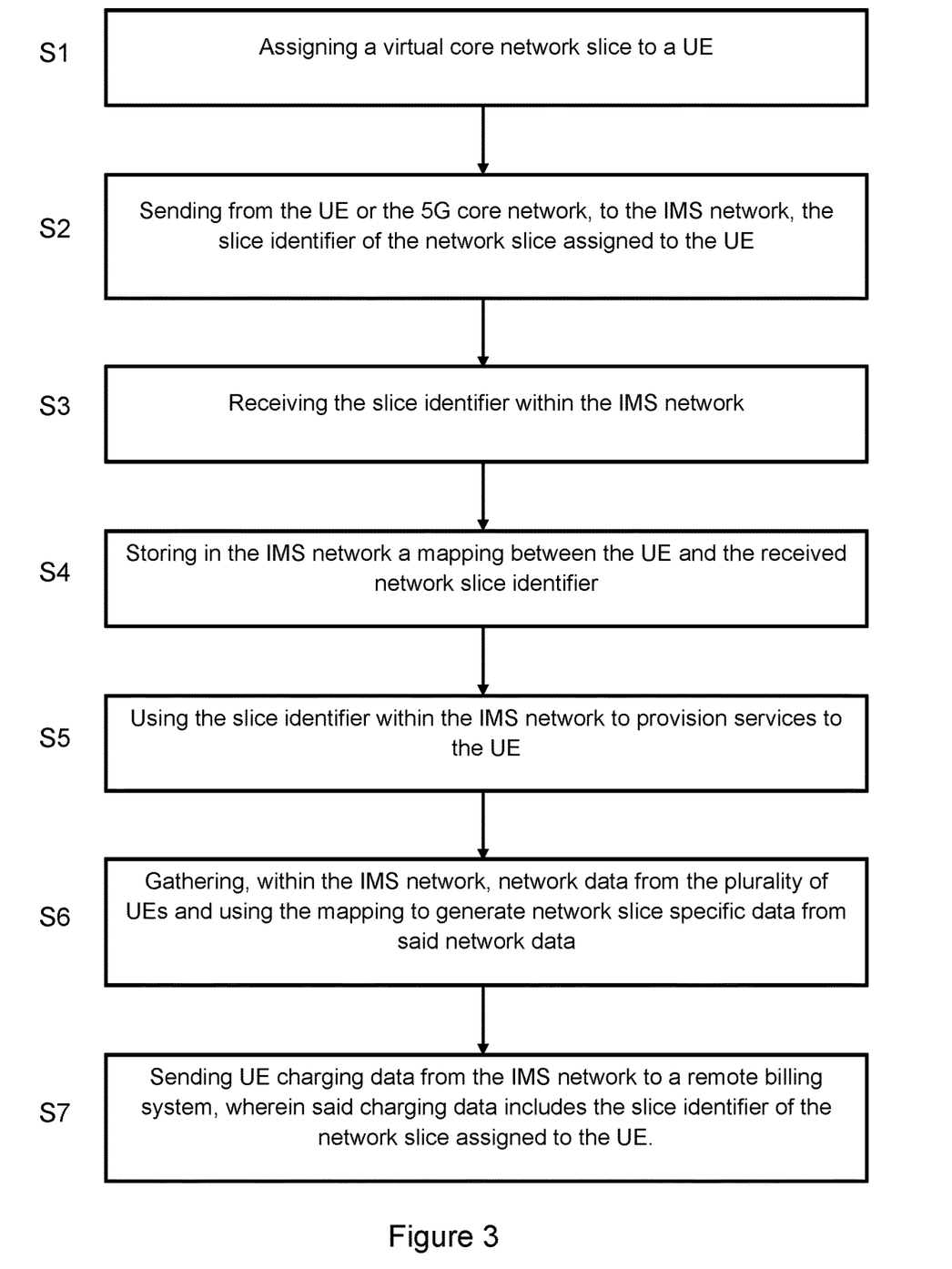
FIG. 3 is a flow diagram illustrating the steps of a method according to an embodiment.

FIG. 3 illustrates the steps of an embodiment of the method. The method comprises assigning one of said virtual core network slices to a User Equipment, UE, at or following registration of said UE with the IMS network S1, and sending from the UE or the 5G core network, to the IMS network, the slice identifier of the network slice assigned to the UE S2. The method further comprises receiving the slice identifier within the IMS network S3 and storing in the IMS network a mapping between the UE and the received network slice identifier S4. The method comprises using the slice identifier within the IMS network to provision services to the UE S5. The method further comprises gathering, within the IMS network, network data from the plurality of UEs and using the mapping to generate network slice specific data from said network data S5, and sending, from the IMS network, UE charging data to a remote billing system, wherein said charging data comprises the slice identifier of the network slice assigned to the UE S7. The billing system can use the charging data for statistics and/or to determine a session cost differentiator.

Figure 4:
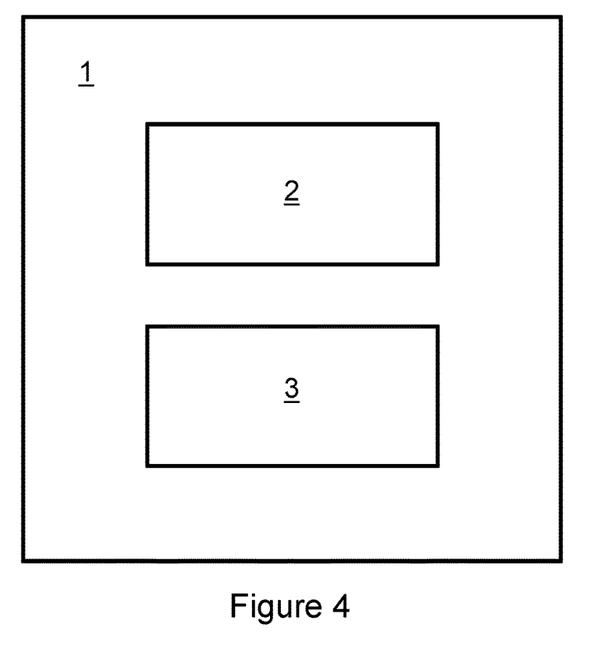
FIG. 4 is a schematic diagram of a UE according to an embodiment.
Figure 5:
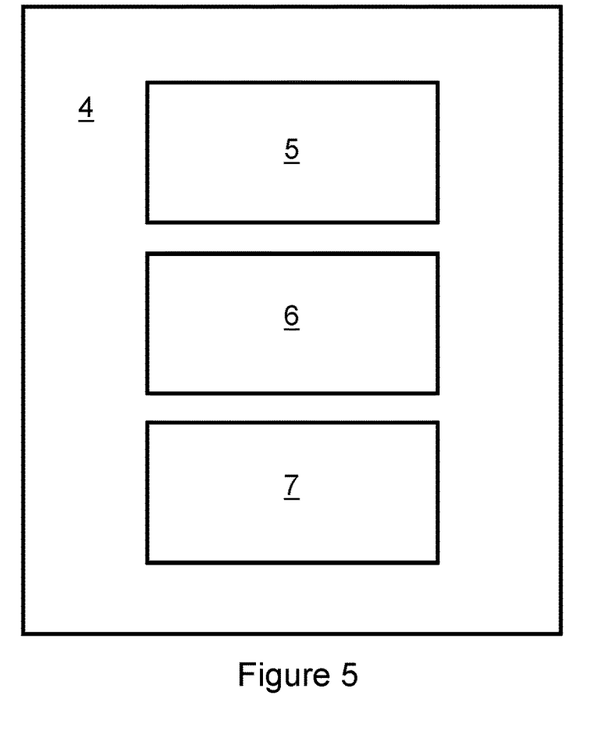
FIG. 5 is a schematic diagram of an apparatus for implementing a P-CSCF according to an embodiment.
Figure 6:
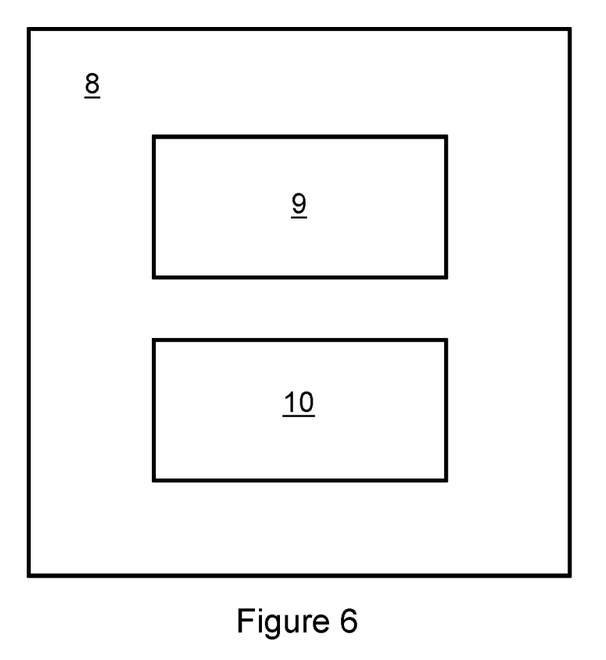
FIG. 6 is a schematic diagram of an apparatus for implementing a PCF according to an embodiment.
Figure 7:
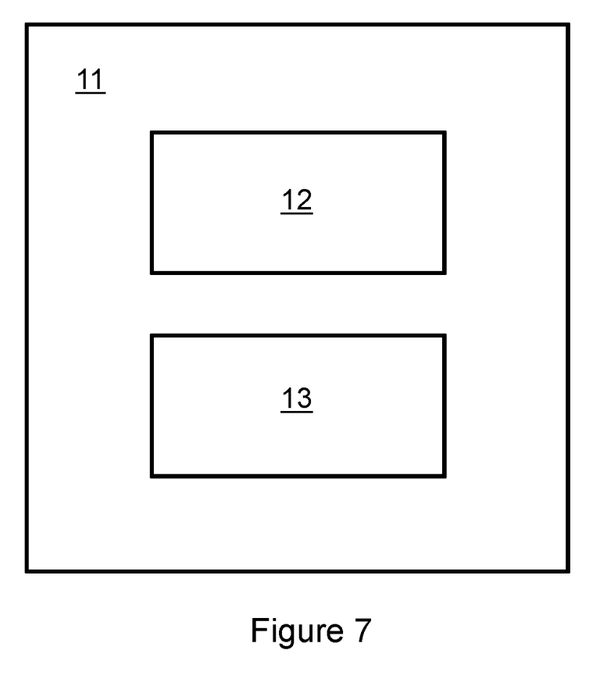
FIG. 7 is a schematic diagram of an apparatus for implementing a SMF according to an embodiment.
Figure 8:
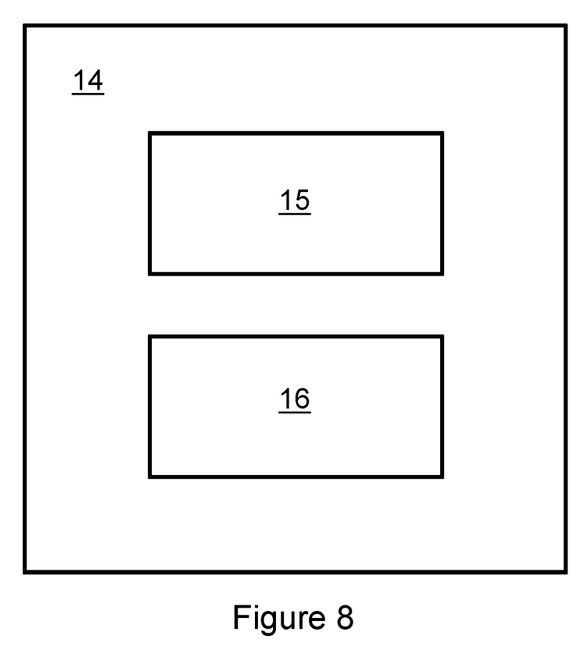
FIG. 8 is a schematic diagram of an AS according to an embodiment.

Apparatus used to implement the method are illustrated in FIGS. 4 to 8. FIG. 4 illustrates a UE 1 with a sender 2 and a receiver 3. FIG. 5 illustrates an apparatus 4 for implementing a P-CSCF. The P-CSCF comprises a sender 5, a receiver 6 and a processor 7. FIG. 6 illustrates an apparatus 8 for implementing a PCF with a sender 9 and a receiver 10. FIG. 7 illustrates an apparatus 11 for implementing a SMF with a sender 12 and a receiver 13. FIG. 8 illustrates an AS 14 comprising a receiver 15 and a processor 16. In general, the receiver (3, 6, 10, 13) and sender (2, 5, 12) may be part of a single transceiver for both sending and receiving. The processor (7, 16) may comprise one or more processing units.

The invention claimed is:

1. A method performed within a communication system comprising a 5G core network and an IP Multimedia Subsystem (IMS) network, where the 5G core network is configured to implement a plurality of virtual core network slices each having a slice identifier, the method comprising:
assigning one of said virtual core network slices to a User Equipment (UE) at or following registration of said UE with the IMS network;
sending from the 5G core network, to the IMS network, the slice identifier of the network slice assigned to the UE;
receiving the slice identifier within the IMS network;
storing in the IMS network a mapping between the UE and the received network slice identifier; and
using the slice identifier within the IMS network to provision services to the UE.

2. The method according to claim 1, wherein said using the slice identifier to provision services comprises providing a service from a subset of services identified as being available to the UE based on the slice identifier.

3. The method according to claim 1 further comprising sending UE charging data from the IMS network to a remote billing system, wherein said charging data includes the slice identifier of the network slice assigned to the UE.

4. The method according to claim 1 further comprising performing the method for a plurality of UEs and storing in the IMS network a mapping between the plurality of UEs registered with the IMS and respective slice identifiers.

5. The method according to claim 4 further comprising gathering, within the IMS network, network data from the plurality of UEs and using the mapping to generate network slice specific data from said network data.

6. The method according to claim 5, wherein said network data comprises a call drop rate, a call success rate, or both the call drop rate and the call success rate of the plurality of UEs, and said network slice specific data accordingly comprises the call drop rate, the call success rate, or both the call drop rate and the call success rate of each network slice assigned to one or more of the UEs.

7. The method according to claim 1, wherein said sending comprises sending the slice identifier from a Policy Control Function (PCF) or a Policy and Charging Rules Function (PCRF) of the 5G core network.

8. The method according to claim 7, wherein said sending is performed in response to receiving at the PCF or PCRF of the 5G network a policy request from a Proxy-Call Session Control Function (P-CSCF) of the IMS network, wherein said policy request is for a session associated with the UE.

9. A method performed by a Policy Control Function (PCF) or a Policy and Charging Rules Function (PCRF) of a 5G core network within a communication system comprising the 5G core network and an IP Multimedia Subsystem (IMS) network, where the 5G core network is configured to provide a plurality of virtual core network slices each having a slice identifier, the method comprising:
receiving from a Proxy-Call Session Control Function (P-CSCF) of the IMS a policy request for a session associated with a User Equipment (UE);
determining policy rules for the session;

sending a request to a Session Management Function (SMF) of the 5G core network to implement the policy rules;
receiving from the SMF a response including a slice identifier of a network slice assigned to the UE; and
sending the response with the slice identifier to the P-CSCF of the IMS.

10. The method according to claim 9, wherein the policy request received from the P-CSCF and the response sent to the P-CSCF are RESTful Hyper Text Transmission Protocol (HTTP) messages or DIAMETER protocol messages.

11. The method according to claim 9, wherein the request sent to the SMF and the response received from the SMF are RESTful Hyper Text Transmission Protocol (HTTP) messages.

12. A method performed by a Proxy-Call Session Control Function (P-CSCF) of an IP Multimedia Subsystem (IMS) network within a communication system comprising a 5G core network and the IMS network, where the 5G core network is configured to provide a plurality of virtual core network slices each having a slice identifier, the method comprising:
sending a policy request for a session associated with a User Equipment (UE) to a Policy Control Function (PCF) or a Policy and Charging Rules Function (PCRF) of the 5G core network; and
receiving a response from the PCF or PCRF including a slice identifier of a network slice assigned to the UE.

13. The method according to claim 12 further comprising the P-CSCF adding the network slice identifier as an asserted network slice feature tag.

14. The method according to claim 13, wherein the asserted network slice feature tag replaces a network slice feature tag previously provided by the UE.

15. An apparatus for implementing a Policy Control Function (PCF) or a Policy and Charging Rules Function (PCRF) of a 5G core network within a communication system comprising the 5G core network and an IP Multimedia Subsystem (IMS) network, where the 5G core network is configured to provide a plurality of virtual core network slices each having a slice identifier, the apparatus comprising:
a receiver configured to receive from a Proxy-Call Session Control Function (P-CSCF) of the IMS a policy request for a session associated with a User Equipment (UE);
a processor configured to determine policy rules for the session; and
a sender configured to send a request to a Session Management Function (SMF) of the 5G core network to implement the policy rules,
wherein the receiver is further configured to receive from the SMF a response including a slice identifier of a network slice assigned to the UE, and the sender is further configured to send the response with the slice identifier to the P-CSCF of the IMS.

16. An apparatus for implementing a Proxy-Call Session Control Function (P-CSCF) of an IP Multimedia Subsystem (IMS) network within a communication system comprising a 5G core network and the IMS network, where the 5G core network is configured to provide a plurality of virtual core network slices each having a slice identifier, the apparatus comprising:
a sender for sending a policy request for a session associated with a User Equipment (UE) to a Policy Control Function (PCF) or a Policy and Charging Rules Function (PCRF) of the 5G core network; and
a receiver for receiving a response from the PCF or PCRF including a slice identifier of a network slice assigned to the UE.

* * * * *